United States Patent
Knettle et al.

(10) Patent No.: US 10,502,390 B1
(45) Date of Patent: Dec. 10, 2019

(54) VEHICLE LAMP ASSEMBLY HAVING A BEZEK, LENS AND LAMP HOUSING WITH A MICRO MESH OF HOLES IN A SIDE WALL

(71) Applicants: Kenneth D Knettle, Lapeer, MI (US); Kyle P Lucas, Livonia, MI (US)

(72) Inventors: Kenneth D Knettle, Lapeer, MI (US); Kyle P Lucas, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/002,288

(22) Filed: Jun. 7, 2018

(51) Int. Cl.
*F21S 45/30* (2018.01)
*B60Q 1/30* (2006.01)
*B60Q 1/04* (2006.01)

(52) U.S. Cl.
CPC ............ *F21S 45/30* (2018.01); *B60Q 1/04* (2013.01); *B60Q 1/30* (2013.01)

(58) Field of Classification Search
CPC .. F21S 45/30; F21S 45/33; F21S 45/37; F21S 45/40
See application file for complete search history.

(56) References Cited

U.S. PATENT DOCUMENTS

| | | | |
|---|---|---|---|
| 2,836,708 A * | 5/1958 | Bobrick | F21V 33/00 362/364 |
| 4,733,335 A | 3/1988 | Serizawa | |
| 5,785,418 A * | 7/1998 | Hochstein | B60Q 1/2696 362/373 |
| 6,547,426 B1 | 4/2003 | Ebara | |
| 10,030,838 B2 * | 7/2018 | Kim | H01L 35/30 |
| 2011/0037368 A1 | 2/2011 | Huang | |

OTHER PUBLICATIONS

Website Printout: Laser-Cutting Polycarbonate / Laser-Cut Polycarbonate—OR Laser, https://www.or-laser.com/en/facts-laser-cutting-polycarbonate/Lasertechnologie GmbH, Germany Hessen, retrieved on Oct. 6, 2016, 11 pages.

Website Printout: Cutting Plastics with Lasers, http://www.sg.trumpf.com/en/metanaviagation/nws-archive/cutting-plasticswith-lasers/ Singapore, retrieved on Oct. 6, 2016, 1 page.

Vintage Exotics, Where Passion Meets Insanity, Porsche 944 Headlight Installation, VE Feb. 2015, Tucson, AZ, USA, 6 pages.

Website Printout: Small Hole Drilling by Laser Hole Drilling Experts Potomac Photonics, http://www.potomac-laser.com/services/core/micro-hole-drilling/ Baltimore, MD, USA, retrieved on Oct. 6, 2016, 11 pages.

* cited by examiner

*Primary Examiner* — Robert J May
(74) *Attorney, Agent, or Firm* — Ralph E Smith

(57) ABSTRACT

A vehicle lamp assembly comprising a lamp housing, a light source, a lens, and a bezel. The light source is attached to and supported by the lamp housing and the lens is spaced from the light source. The lens is attached to and supported by the bezel. The lamp housing, lens, and/or bezel include a wall with one or more perforated areas that are defined by a micro mesh of holes. Each hole in the micro mesh has a cross-sectional area that is less than 0.3 square millimeters. The micro mesh of holes provides airflow through the vehicle lamp assembly to reduce or eliminate the build-up of condensation inside the vehicle lamp assembly. The micro mesh of holes may be backlit or arranged in a pattern to enhance aesthetics or create a logo on the vehicle lamp assembly.

13 Claims, 6 Drawing Sheets

VEHICLE LAMP ASSEMBLY HAVING A BEZEK, LENS AND LAMP HOUSING WITH A MICRO MESH OF HOLES IN A SIDE WALL

FIELD

The subject disclosure generally relates to vehicle lamp assemblies such as headlight assemblies and taillight assemblies. More particularly, a solution for venting vehicle lamp assemblies is disclosed to reduce or eliminate condensation inside vehicle lamp assemblies.

BACKGROUND

This section provides background information related to the present disclosure which is not necessarily prior art.

A wide variety of different vehicles are equipped with one or more lamp assemblies to allow nighttime operation of the vehicle and/or to provide signaling capabilities. Such light assemblies are typically located on the exterior of the vehicle. In the automotive industry, road-going vehicles are commonly provided with headlights (also known as headlamps), taillights (also known as tail lamps), indicator lights (also known as indicators), and running lights. The headlights illuminated the roadway ahead of the vehicle while the taillights and indicator fights illuminate to signal to other drivers that the vehicle is braking, stopped (e.g. hazard flashing), turning, or in reverse. The headlights, taillights, and running lights also make the vehicle more visible to other drivers during nighttime operation and during weather conditions that limit visibility.

The vehicle lamp assemblies often comprise a lamp housing, a light source, a reflector, and a lens. Some vehicle lamp assemblies also include a bezel that secures the lens to the body of the vehicle. The lamp housing, lens, and/or bezel typically form one or more internal lamp cavities with the light source positioned inside one of the internal lamp cavities. One problem that frequently occurs in such vehicle lamp assemblies is that condensation can build-up inside the internal lamp cavities, which can fog up the lens and/or cause the light source, socket, and/or wiring harness to corrode or short-out. Condensation within the internal lamp cavities can therefore be detrimental to the aesthetic appearance and functionality of vehicle lamp assemblies. Customer complaints about condensation within the internal lamp cavities remains one of the most common warranty claims for vehicle lighting components.

SUMMARY

This section provides a general summary of the disclosure, and is not a comprehensive disclosure of its full scope or all of its features.

The subject disclosure provides for a vehicle lamp assembly comprising a lamp housing, a light source, a lens, and a bezel. The light source is attached to and supported by the lamp housing and the lens is spaced from the light source. The lens is attached to and supported by the bezel. The lamp housing, lens, and/or bezel include a wall with one or more perforated areas that are defined by a micro mesh of holes. Each hole in the micro mesh has a cross-sectional area that is less than or equal to 0.3 square millimeters (mm$^2$). Advantageously, the micro mesh of holes provides airflow through the vehicle lamp assembly to reduce or eliminate the build-up of condensation inside the vehicle lamp assembly. As a result, the vehicle lamp assembly disclosed herein has greater reliability and performance throughout its service life. In addition, the vehicle lamp assembly disclosed herein improves customer perception of quality by reducing or eliminating complaints related to condensation build-up inside vehicle lamp assemblies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
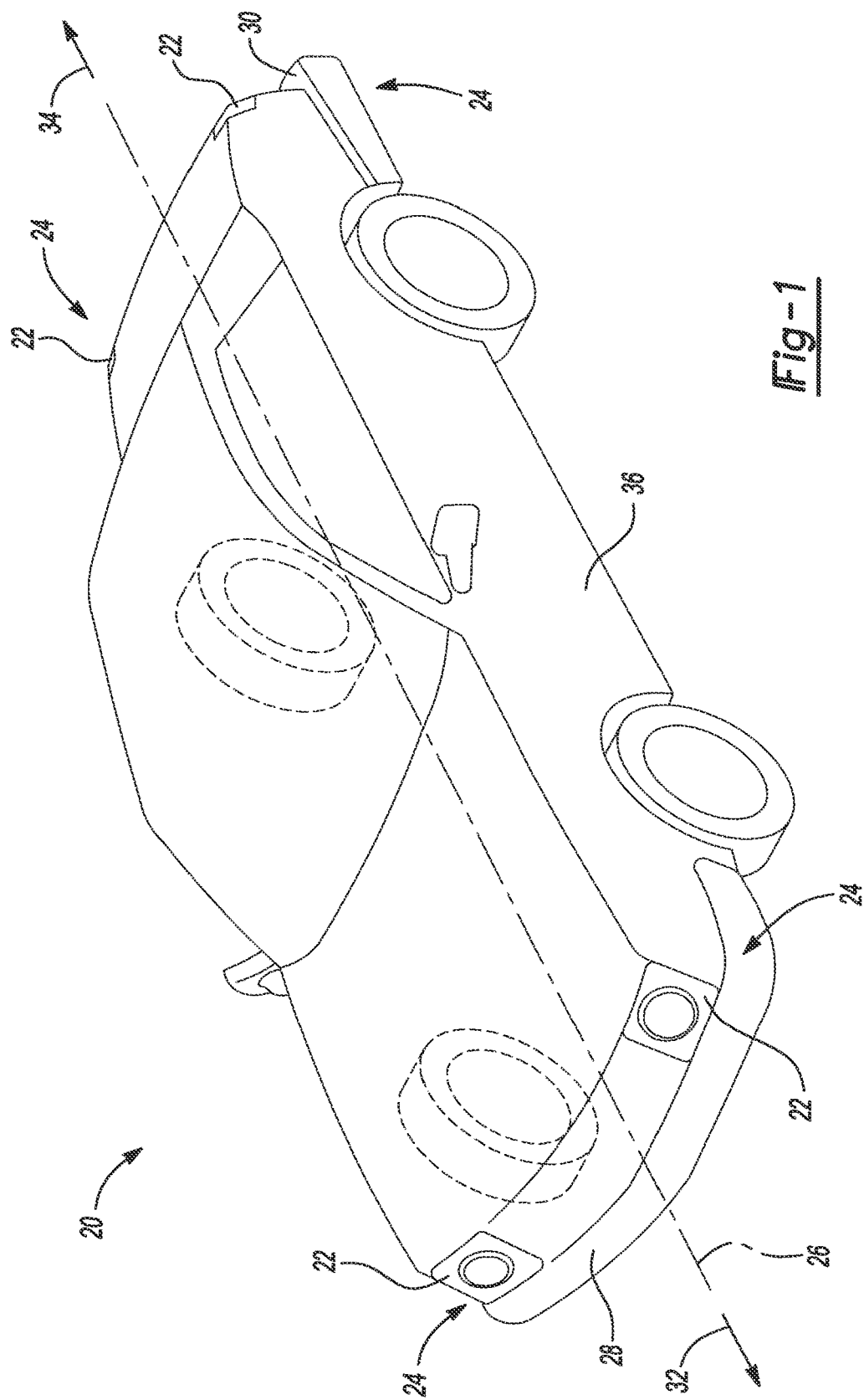
FIG. 1 is a front perspective view of a vehicle equipped with exemplary vehicle lamp assemblies constructed in accordance with the subject disclosure.

Referring to the Figures, like numerals indicate corresponding parts throughout the several views.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," "attached to," or "coupled to" another element or layer, it may be directly on, engaged, attached, connected or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "interior," "exterior," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle 20 is illustrated with four vehicle lamp assemblies 22 that are constructed according to the subject disclosure with one vehicle lamp assembly 22 at each corner 24 of the vehicle 20. The corners 24 of the vehicle 20 and therefore the vehicle lamp assemblies 22 are outboard of a centerline 26 of the vehicle 20 that extends between a front end 28 of the vehicle 20 and a rear end 30 of the vehicle 20. The centerline 26 extends from the front end 28 of the vehicle 20 in a forward driving direction 32 and the centerline 26 extends from the rear end 30 of the vehicle 20 in a reverse driving direction 34. The vehicle lamp assemblies 22 are mounted to a body of the vehicle 20 (i.e., vehicle body 36). The vehicle lamp assemblies 22 positioned at the front end 28 of the vehicle 20 are configured as headlights (also called headlamps) and the vehicle lamp assemblies 22 positioned at the rear end 30 of the vehicle 20 are configured as taillights (also called tail lamps). These vehicle lamp assemblies 22 are provided simply as examples. It should be appreciated that the scope of the subject disclosure is applicable to all vehicle lamp assemblies 22, regardless of their shape, location on the vehicle 20, or function. By way of example and without limitation, the teachings of the subject disclosure are applicable to headlights (also known as headlamps), taillights (also known as tail lamps), indicator lights (also known as indicators), and running lights.

Figure 2:
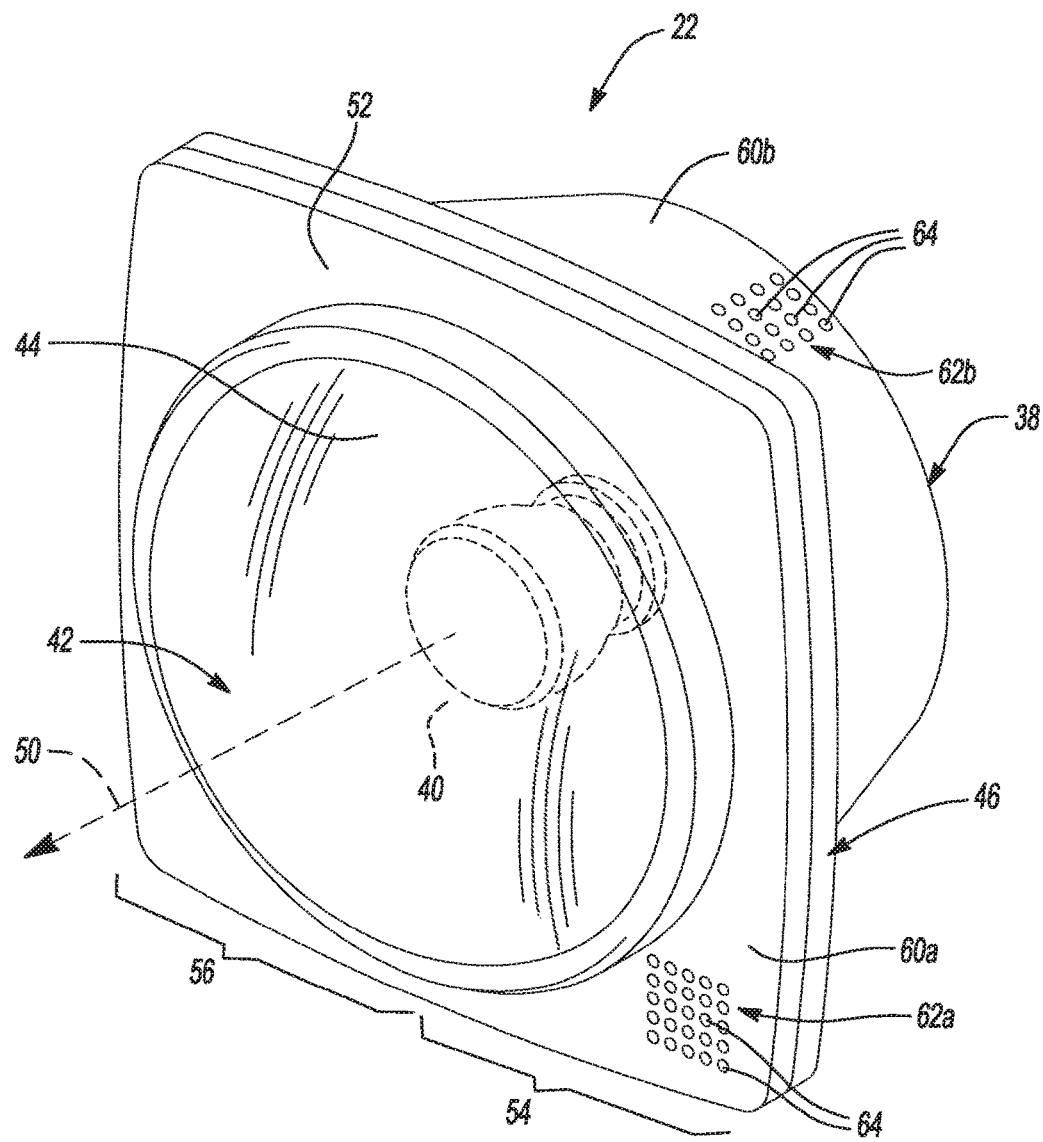
FIG. 2 is a front perspective view of an exemplary vehicle lamp assembly constructed in accordance with the subject disclosure.
Figure 3:
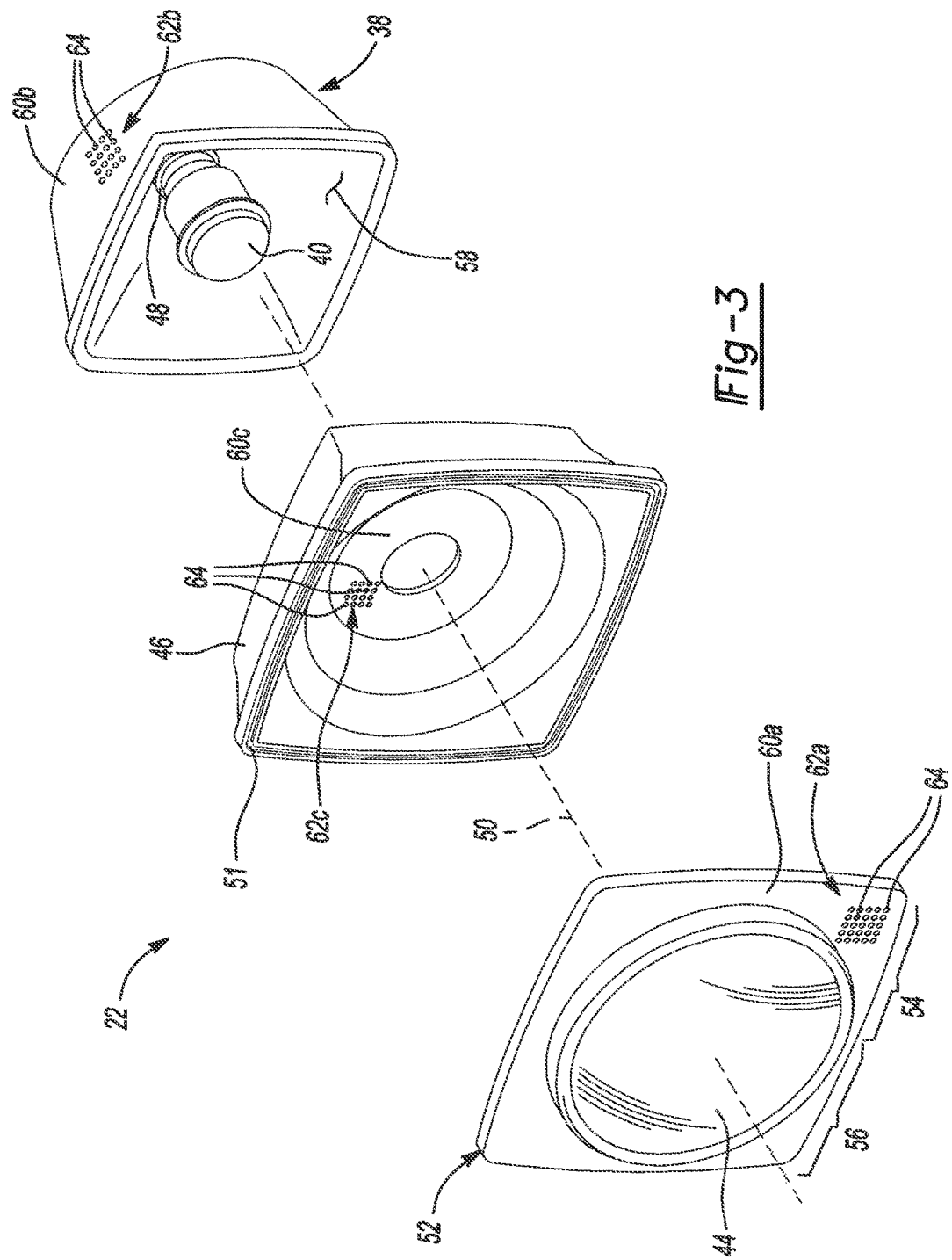
FIG. 3 is an exploded front perspective view of the vehicle lamp assembly illustrated in FIG. 2.
Figure 4:
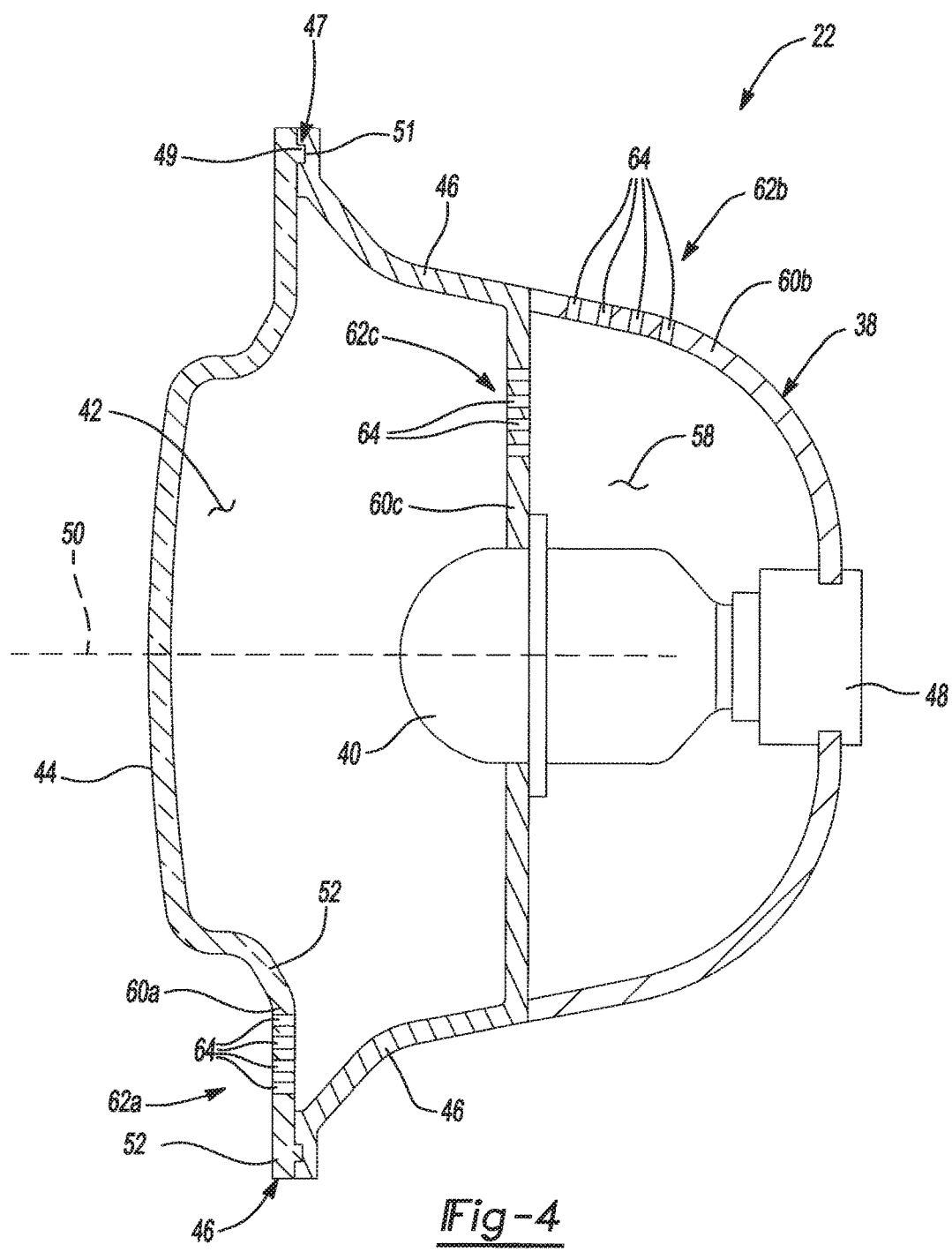
FIG. 4 is a side cross-sectional view of the vehicle lamp assembly illustrated in FIG. 2.

With reference to FIGS. 2-4, each vehicle lamp assembly 22 generally includes a lamp housing 38, a light source 40, a lens 44, and a bezel 46. The lamp housing 38 is attached to the vehicle body 36. Although the lamp housing 38 may be made of a wide variety of different materials, by way of non-limiting example, the lamp housing 38 may be made of plastic or metal. The light source 40 is attached to and supported by the lamp housing 38. For example, the lamp housing 38 may include a socket 48 that receives and supports the light source 40. The socket 48 may also electrically connect the light source 40 to a wire harness (not shown) that operates to provide electricity to the light source 40. It should be appreciated a wide variety of different light sources 40 can be used. By way of example and without limitation, the light source 40 may include one or more incandescent light bulbs, halogen light bulbs, xenon light bulbs, high intensity discharge light bulbs, and/or light emitting diodes and may be configured as a projector lamp subassembly.

A light source axis 50 extends co-axially with the light source 40. Depending upon the type of vehicle lamp assembly 22, the light source axis 50 may be substantially parallel to and pointed in the same direction as the forward driving direction 32 in the case of a headlight, the light source axis 50 may extend substantially parallel to and pointed in the same direction as the reverse driving direction 34 in the case of a taillight, or alternative may extend away from the centerline 26 of the vehicle 20 in other lamp configurations. The light source 40 is configured to emit a beam of light along the light source axis 50; however, it should be appreciated that the light source 40 may also emit beams of light in other directions that do not extend along the light source axis 50.

The lens 44 is spaced from the light source 40 with the light source axis 50 intersecting the lens 44. The lens 44 is designed to protect the light source 40 and the reflector from environmental conditions (e.g., rain and snow) and from debris (e.g., dust, sand, and gravel). The lens 44 has a lens perimeter 52 and is made of a light transmitting material, meaning that the beams of light emitted by the light source 40 can pass through the lens 44. In other words, the lens 44 is transparent or translucent. Although a wide variety of different materials may be used, examples of the light transmitting material include, but are not limited to, glass, acrylic, and plastic. Depending upon the type of vehicle lamp assembly 22, the lens 44 may be for example a headlight lens or a taillight lens and may be clear, tinted, red, orange, or combinations thereof. Optionally, the lens 44 may be shaped to focus, direct, or scatter the beams of light emitted from the light source 40.

The lens 44 is attached to and supported by the bezel 46 and the bezel 46 attached to and supported by the vehicle body 36. In the illustrated example, the lens 44 and the bezel 46 are connection by a glue joint 47 where a rib 49 protruding from the lens 44 is received in a glue channel 51 in the bezel 46. The bezel 46 is connected to the lamp housing 38 by glue, fasteners, clips or other attachment mechanisms. Although a wide variety of different materials may be used, the bezel 46 may be made of plastic. The vehicle lamp assembly 22 has an outboard half 54 and an inboard half 56. The outboard half 54 and inboard half 56 are not necessarily separate components, but rather different spatial portions or regions of the vehicle lamp assembly 22. The inboard half 56 is closer to the centerline 26 of the vehicle body 36 than the outboard half 54.

The bezel 46 and the lens 44 cooperate to define a first internal lamp cavity 42 and the bezel 46 and the lamp housing 38 cooperate to define a second internal lamp cavity 58. The light source 40 is disposed within the second internal lamp cavity 58. In typical vehicle lamp assemblies 22, condensation (i.e., moisture) can build-up or accumulate in the internal lamp cavities 42, 58 and can fog up the lens 44 and/or cause the light source 40, socket 48, and/or wiring harness to corrode or short-out. As a result, condensation within the Internal lamp cavities 42, 58 can be detrimental to the aesthetic appearance and functionality of the vehicle lamp assembly 22 and can lead to customer complaints and a perception that the vehicle lamp assembly 22 is of poor quality.

To address this problem, the vehicle lamp assembly 22 of the subject disclosure includes a venting solution. With additional reference to FIG. 5, the lamp housing 38, lens 44, and/or bezel 46 include a wall 60a, 60b, 60c with one or more perforated areas 62a, 62b, 62c that are defined by a micro mesh of holes 64. Each hole 64 in the micro mesh has a cross-sectional area 66 of less than 0.3 square millimeters (mm²). By way of example and without limitation, each hole 64 in the micro mesh may preferably have a cross-sectional area 66 of that ranges from 0.018 square millimeters (mm²) to 0.071 square millimeters (mm²) depending on the specifications (e.g., internal volume, wattage, etc.) of the vehicle lamp assembly 22. Advantageously, the micro mesh of holes 64 provides airflow in the internal lamp cavities 42, 58 of the vehicle lamp assembly 22 to reduce condensation within the internal lamp cavities 42, 58. As such, the perforated areas 62a, 62b, 62c are configured to provide a certain volumetric flowrate for the airflow through the internal lamp cavities 42, 58. The perforated areas 62a, 62b, 62c may be configured to provide a volumetric flowrate that enables the air in the internal lamp cavities 42, 58 to be completely replenished (i.e., 100 percent turnover) in 1 minute at a pressure differential of 0.7 pounds per square inch (psi). For example and without limitation, if the internal lamp cavities 42, 58 have a combined volume of 16 liters (L), then the perforated areas 62a, 62b, 62c may be configured to allow 16 liters (L) of air to flow through (i.e., enter and escape) the vehicle lamp assembly 22 when pushed by a pressure differential of 0.7 pounds per square inch (psi). Although other configurations are possible, each perforated area 62a, 62b, 62c is an array of holes that may range from 3 holes wide and 3 holes high to 25 holes wide and 25 holes high and may cover, for example, an overall area of approximately 6.45 square centimeters (cm²).

Figure 6:
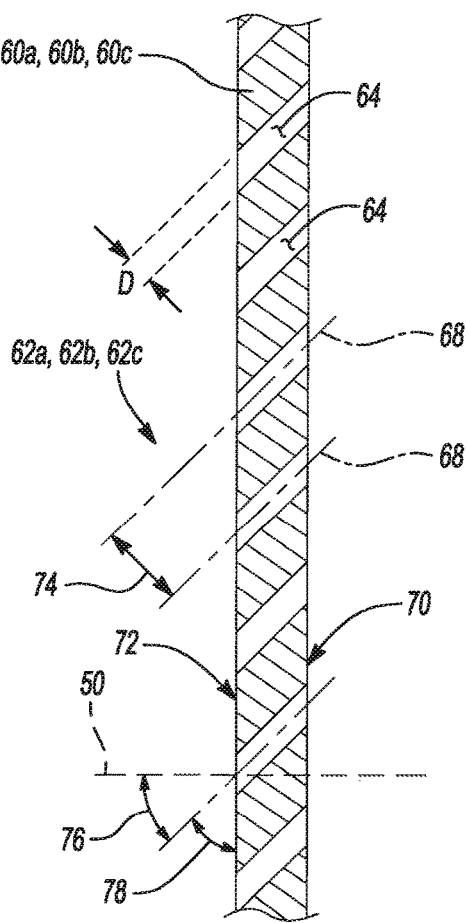
FIG. 6 is an enlarged side cross-sectional view of the perforated area of the vehicle lamp assembly illustrated in FIG. 5.

With additional reference to FIG. 6, each hole 64 in the micro mesh extends through the wall 60a, 60b, 60c of the lamp housing 38, lens 44, and/or bezel 46 along a hole axis 68 from an interior surface 70 to an exterior surface 72 of the wall 60a, 60b, 60c. The hole axes 68 of the holes 64 in the micro mesh may be arranged parallel to each other and spaced apart by a hole centerline spacing 74. For example, the hole centerline spacing 74 may range from 0.7 to 1.2 millimeters (mm). The hole axis 68 of each hole 64 in the micro mesh is arranged at a hole angle 76 that is greater than zero degrees, but less than ninety degrees, relative to the light source axis 50. As shown in FIG. 6, the hole angle 76 may be downwardly directed, moving from the interior surface 70 to the exterior surface 72 of the wall 60a, 60b, 60c, to allow water to run out of the internal lamp cavity 58 through the micro mesh of holes 64 under the pull of gravity. Alternatively, the hole axis 68 may be arranged in a direction that extends outwardly away from the centerline 26 of the vehicle 20.

Figure 5:
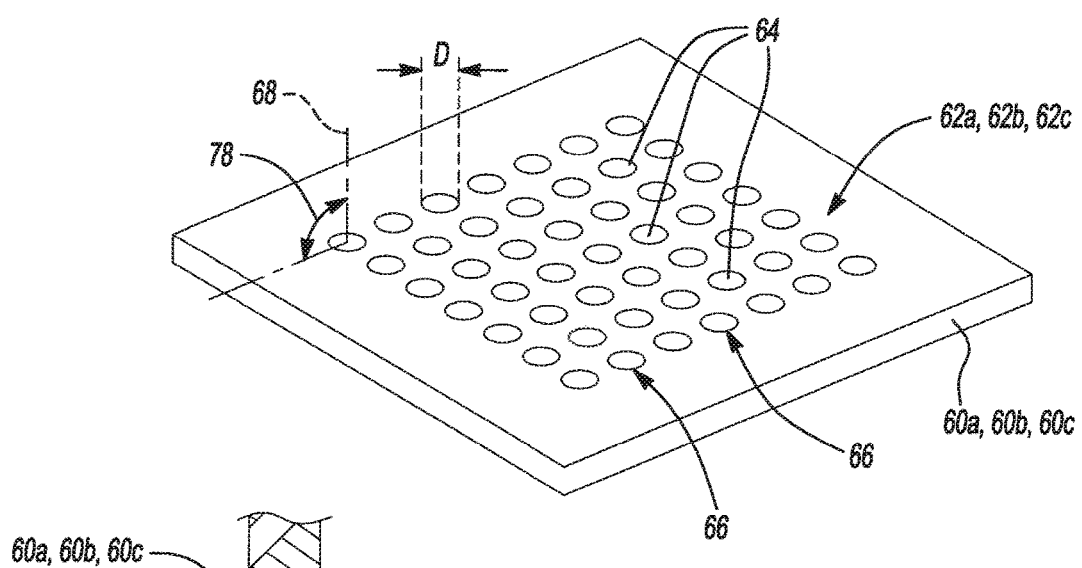
FIG. 5 is an enlarged side perspective view of a perforated area of the vehicle lamp assembly illustrated in FIG. 2.

The hole axis 68 of each hole 64 in the micro mesh is also arranged at a penetration angle 78 relative to the exterior surface 72 of the wall 60a, 60b, 60c. As shown in FIG. 5, the penetration angle 78 may be equal to ninety degrees such that each hole 64 extends perpendicularly through the wall 60a, 60b, 60c.

Alternatively, FIG. 6 illustrates an arrangement where the penetration angle 78 of each hole 64 in the micro mesh is greater than zero degrees, but less than ninety degrees, relative to the exterior surface 72 of the wall 60a, 60b, 60c.

The shape of the holes 64 in the micro mesh may vary. For example, each hole 64 in the micro mesh may have a cylindrical shape and a hole diameter D that ranges from 0.15 to 0.30 millimeters (mm). Alternatively, each hole 64 in the micro mesh may have a non-cylindrical shape, such as a cubic or other shape. As such, it should be appreciated that the holes 64 in the micro mesh need not necessarily have circular shaped openings as shown in the illustrated example. In addition, it should be appreciated that different configurations are possible where the micro mesh has holes 64 of uniform size, shape, and/or spacing or where the micro mesh has holes 64 of irregular (i.e., varying) size, shape, and/or spacing. The micro mesh of holes 64 can be made using a wide variety of different manufacturing operations. By way of example, the micro mesh of holes 64 may be formed by laser cutting.

In the illustrated example, the lens 44 includes a first perforated area 62a, the lamp housing 38 includes a second perforated area 62b, and the bezel 46 includes a third perforated area 62c. The micro mesh of holes 64 in the first perforated area 62a are positioned in the outboard half 54 of the vehicle lamp assembly 22 with the hole axis 68 of each hole 64 in the micro mesh pointing away from the centerline 26 of the vehicle body 36. In accordance with this arrangement, the micro mesh of holes 64 in the first perforated area 62a scavenge/pull air flowing along the vehicle body 36 and past the lens 44 into the first internal lamp cavity 42. The air entrained by the micro mesh of holes 64 in the first perforated area 62a flows through the first internal lamp cavity 42, passes through the micro mesh of holes 64 in the third perforated area 62c, and is vented/discharged through the micro mesh of holes 64 in the second perforated area 62b. Even when the vehicle 20 is stationary, the perforated areas 62a, 62b, 62c provide airflow through the vehicle lamp assembly 22 by allowing air to flow into and out of the vehicle lamp assembly 22 due to convection currents formed within the internal lamp cavities 42, 58 as a result of the heat generated by the light source 40. It should be appreciated that the number, location, and configuration of the one or more perforated areas 62a, 62b, 62c can be varied from the configuration shown in the Figures and tailored to the specifications of a particular vehicle lamp assembly 22. For example, in the illustrated example the first perforated area 62a is located below the light source axis 50 and the second and third perforated areas 62b, 62c are located above the light source axis 50 to promote convection driven airflow through the vehicle lamp assembly 22 when the vehicle 20 is stationary.

Figure 7:
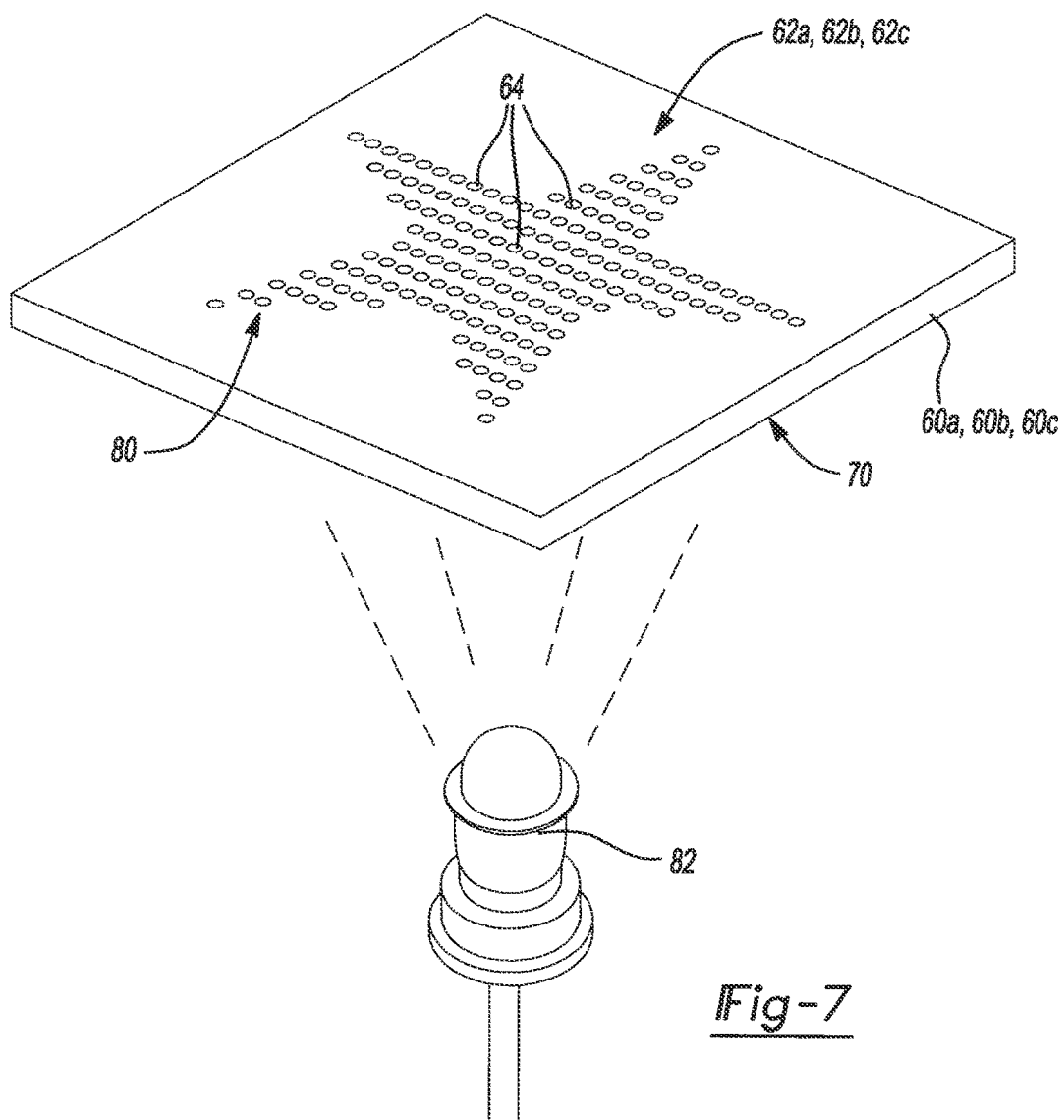
FIG. 7 is an enlarged front perspective view of a perforated area of another vehicle lamp assembly constructed in accordance with the subject disclosure where the perforated area forms a logo.

With reference to FIG. 7, the micro mesh of holes 64 may optionally be arranged in a pattern 80 that forms a logo, letter, word, and/or words. As a result, the micro mesh of holes 64 can be used to apply branding, a part identification label, or authentic designs to the lamp housing 38, lens 44, and/or bezel 46 in addition to providing airflow through the internal lamp cavities 42, 58. The micro mesh of holes 64 may also be backlit by the light source 40 of the vehicle lamp assembly 22 or a backlight 82 positioned adjacent to the interior surface 70 of the wall 60a, 60b, 60c. Such an arrangement increases the visibility of the micro mesh of holes 64, particularly at night, which may be desirable when the micro mesh of holes 64 are arranged in a pattern 80 that forms a logo, letter, word, and/or words. In addition, backlighting the micro mesh of holes 64 can be used to provide accent lighting to the vehicle lamp assembly 22. Many of today's vehicles 20 have lamp assemblies with lines of light emitting diodes (LEDs) that are spaced from the primary light source to provide accent lighting. The vehicle lamp assembly 22 disclosed herein can provide a similar visual effect without the cost and power consumption of a separate line of light emitting diodes, while at the same time reducing or eliminating condensation within the internal lamp cavities 42, 58.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A vehicle lamp assembly comprising:
   a lamp housing;
   a light source attached to and supported by said lamp housing;
   a lens spaced from said light source;
   a bezel attached to and supporting said lens; and
   at least one of said lamp housing, said lens, and said bezel including a wall having at least one perforated area defined by a micro mesh of holes, each hole in said micro mesh having a cross-sectional area of less than 0.3 square millimeters,
   wherein each hole in said micro mesh extends through said wall along a hole axis from an interior surface to an exterior surface of said wall,
   wherein a light source axis is arranged co-axially with said light source, and
   wherein said hole axis of each hole in said micro mesh is arranged at a hole angle that is greater than zero degrees relative to said light source axis and less than ninety degrees relative to said light source axis.

2. The vehicle lamp assembly as set forth in claim 1, wherein said hole angle is downwardly directed moving from said interior surface to said exterior surface of said wall.

3. The vehicle lamp assembly as set forth in claim 1, wherein said hole axis of each hole in said micro mesh is arranged at a penetration angle that is greater than zero degrees relative to said exterior surface of said wall and less than ninety degrees relative to said exterior surface of said wall.

4. The vehicle lamp assembly as set forth in claim 1, wherein said vehicle lamp assembly has an outboard half and an inboard half that is closer to a centerline of a vehicle body than said outboard half, and wherein said micro mesh of holes extend through said lens and are positioned in said outboard half of said vehicle lamp assembly with said hole axis of each hole in said micro mesh pointing away from the centerline of the vehicle body.

5. The vehicle lamp assembly as set forth in claim 1, wherein said hole axes of said holes in said micro mesh are arranged parallel to each other and spaced apart by a hole centerline spacing that ranges from 0.7 to 1.2 millimeters.

6. The vehicle lamp assembly as set forth in claim 1, wherein said micro mesh of holes is backlit by at least one of said light source and a backlight positioned adjacent to said interior surface of said wall.

7. The vehicle lamp assembly as set forth in claim 1, wherein said micro mesh of holes is formed by laser cutting.

8. The vehicle lamp assembly as set forth in claim 1, wherein said micro mesh of holes are arranged in a pattern that forms at least one of a logo, letter, word, or words.

9. The vehicle lamp assembly as set forth in claim 1, wherein each hole in said micro mesh has a non-cylindrical shape.

10. A vehicle lamp assembly comprising:
    a lamp housing;
    a light source attached to and supported by said lamp housing;
    a lens spaced from said light source;
    a bezel attached to and supporting said lens; and
    at least one of said lamp housing, said lens, and said bezel including a wall having at least one perforated area defined by a micro mesh of holes, each hole in said micro mesh having a cross-sectional area of less than 0.3 square millimeters,
    wherein said bezel and said lens cooperate to define a first internal lamp cavity and said bezel and said lamp housing cooperate to define a second internal lamp cavity,
    wherein said light source is disposed within said second internal lamp cavity, and
    wherein said micro mesh of holes extend through said bezel to provide airflow between said first and second internal lamp cavities to reduce condensation.

11. The vehicle lamp assembly as set forth in claim 10, wherein said cross-sectional area of each hole in said micro mesh ranges from to 0.018 to 0.071 square millimeters.

12. A vehicle lamp assembly comprising:
    a lamp housing;
    a light source attached to and supported by said lamp housing;
    a lens spaced from said light source;
    a bezel attached to and supporting said lens; and
    at least one of said lamp housing, said lens, and said bezel including a wall having at least one perforated area defined by a micro mesh of holes, each hole in said micro mesh having a cross-sectional area of less than 0.3 square millimeters,
    wherein said at least one perforated area is an array of holes that ranges from 3 holes wide and 3 holes high to 25 holes wide and 25 holes high.

13. The vehicle lamp assembly as set forth in claim 12, wherein each hole in said micro mesh has a cylindrical shape and a hole diameter that ranges from 0.15 to 0.30 millimeters.

* * * * *